UNITED STATES PATENT OFFICE.

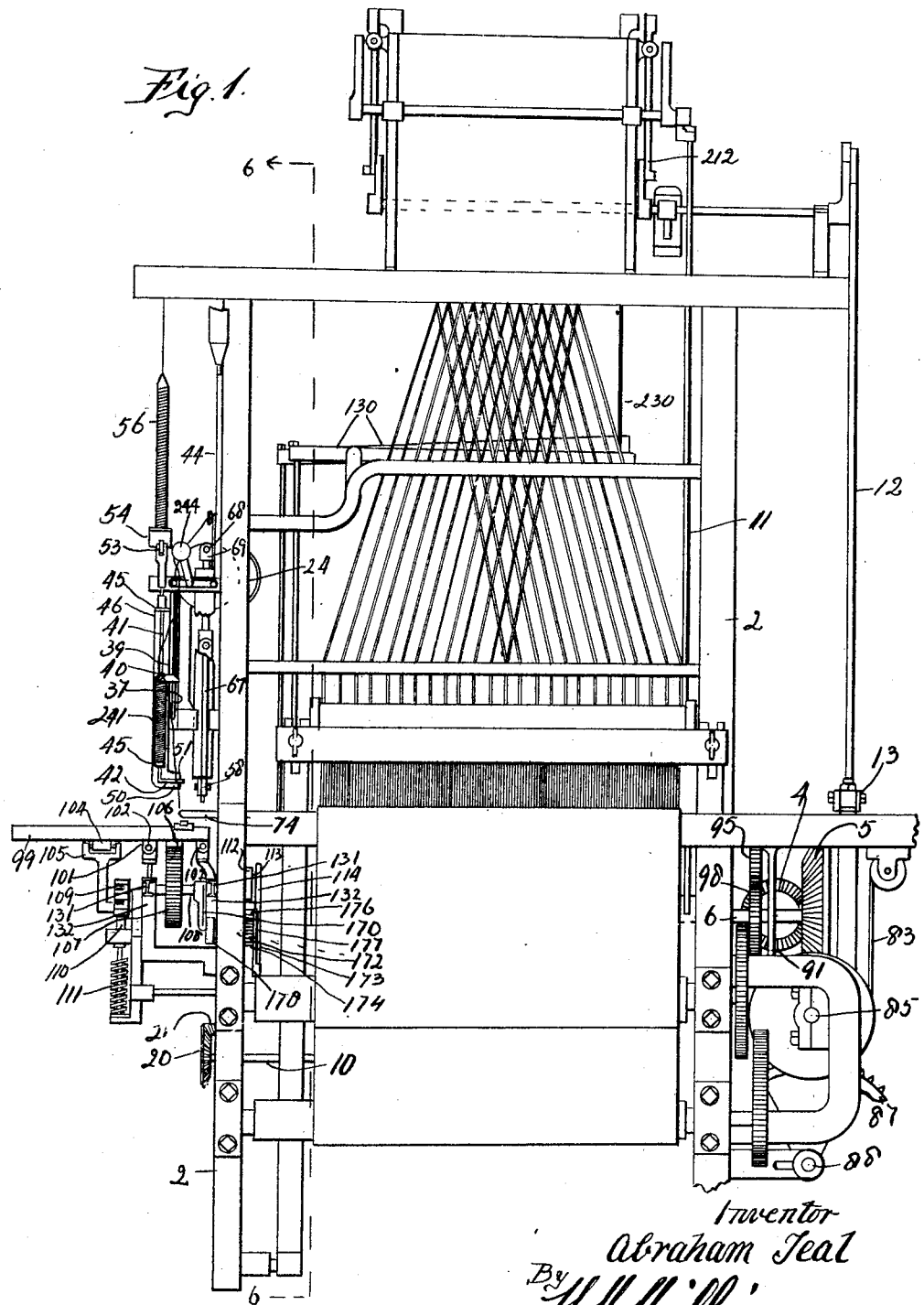

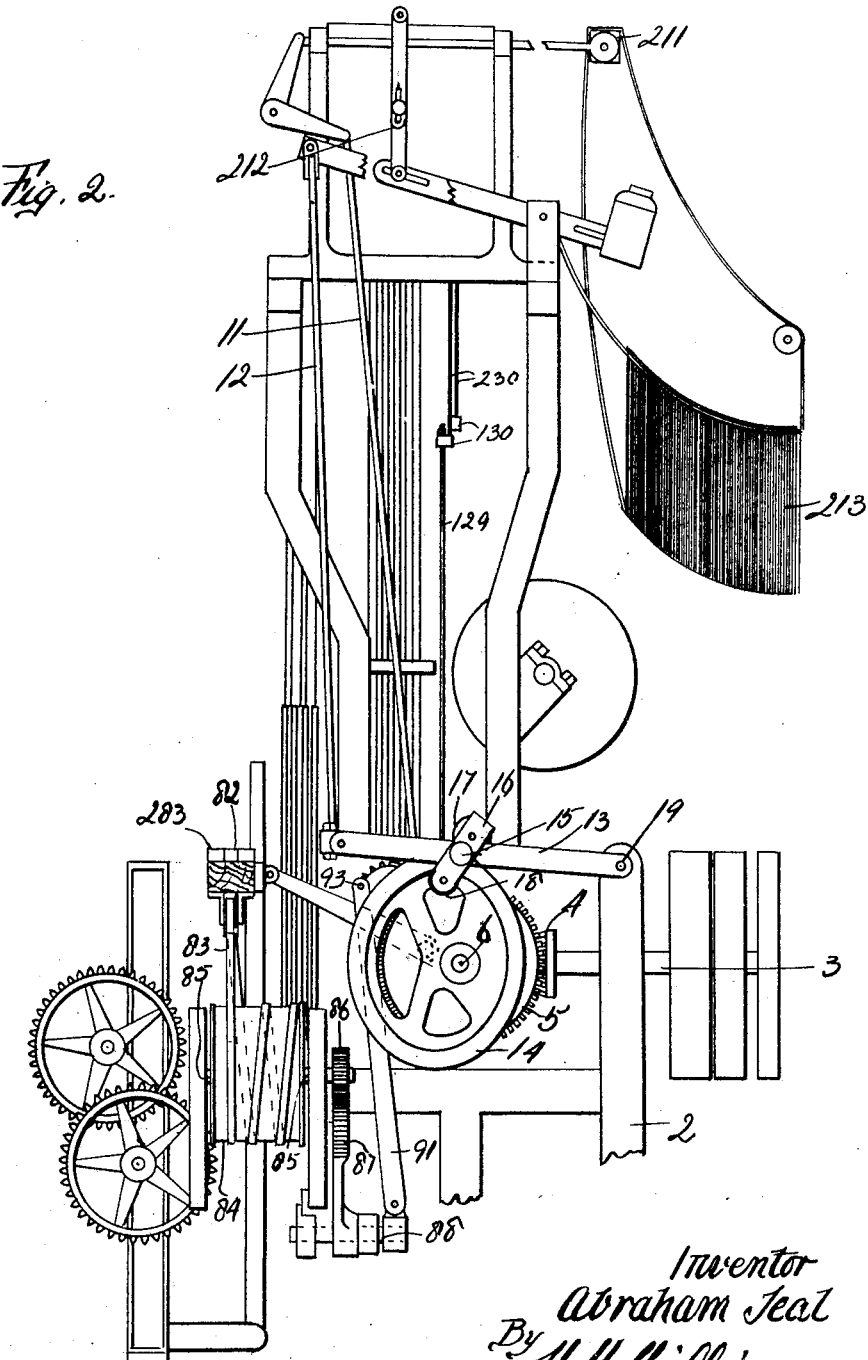

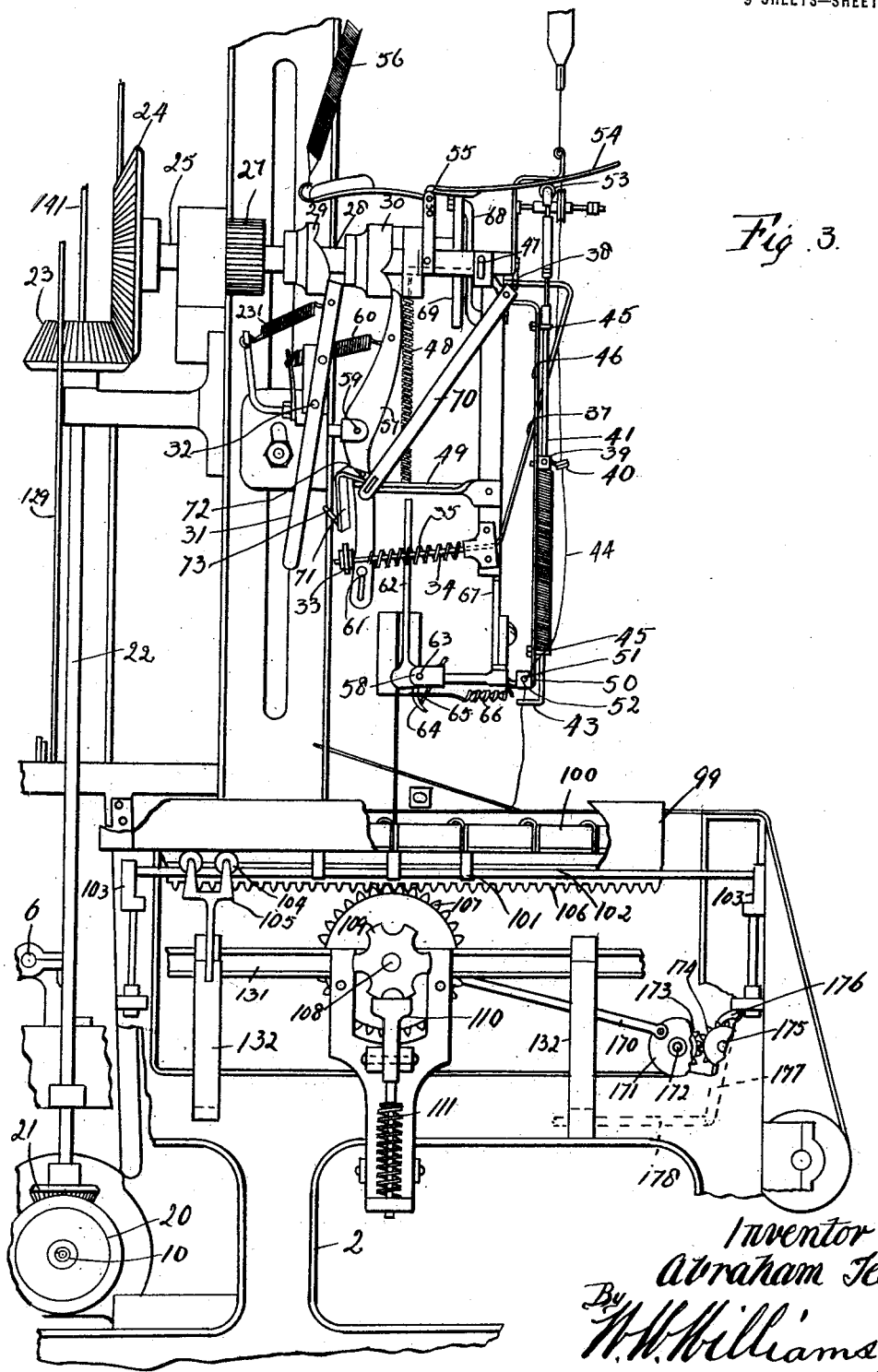

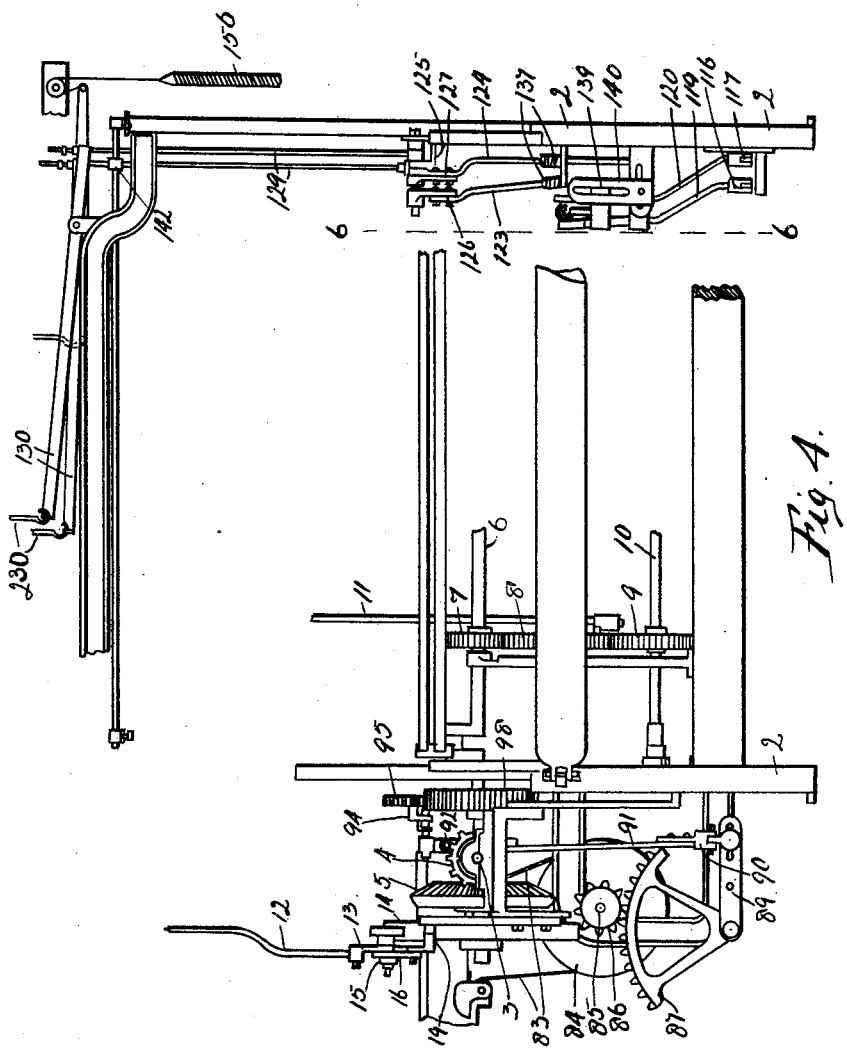

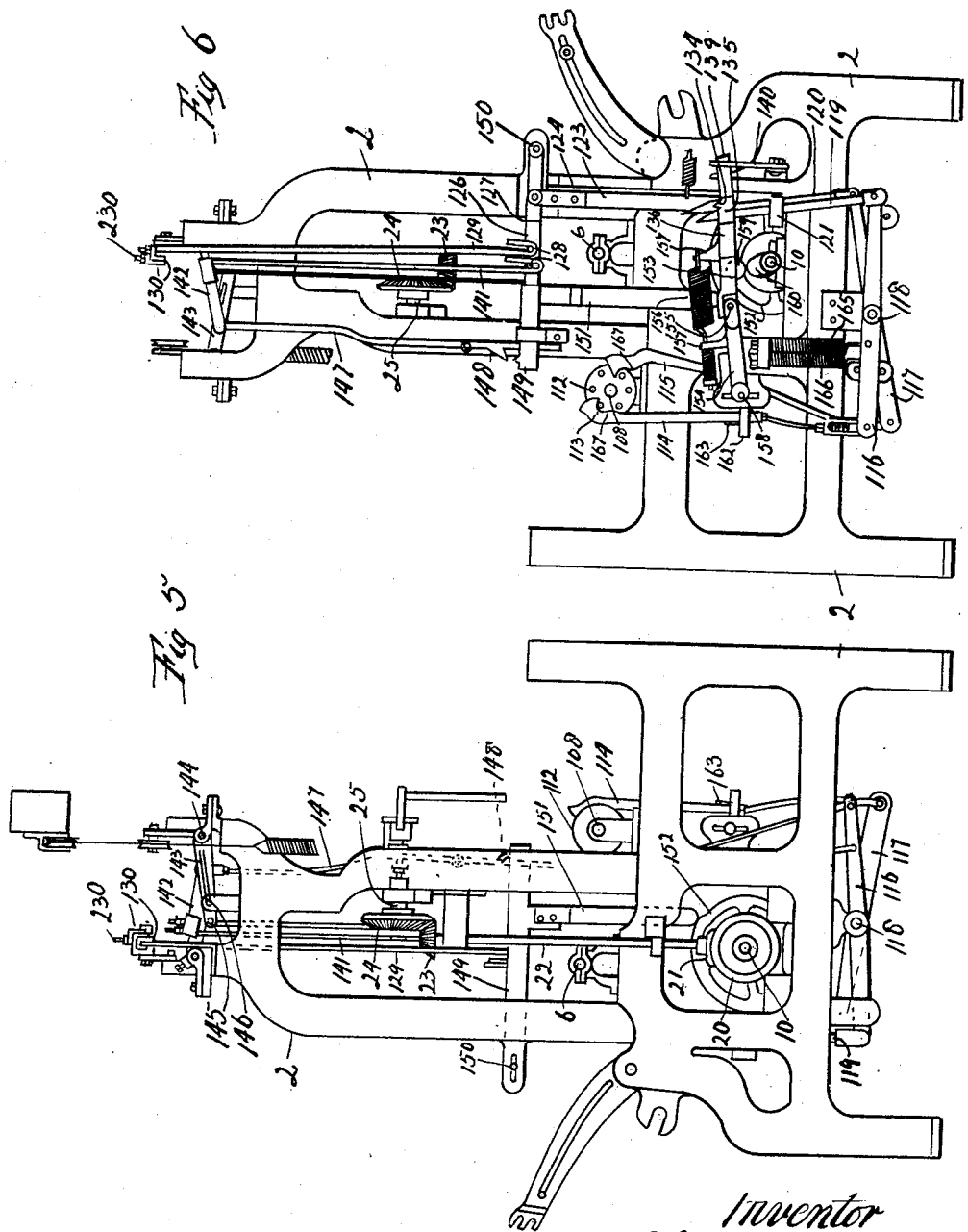

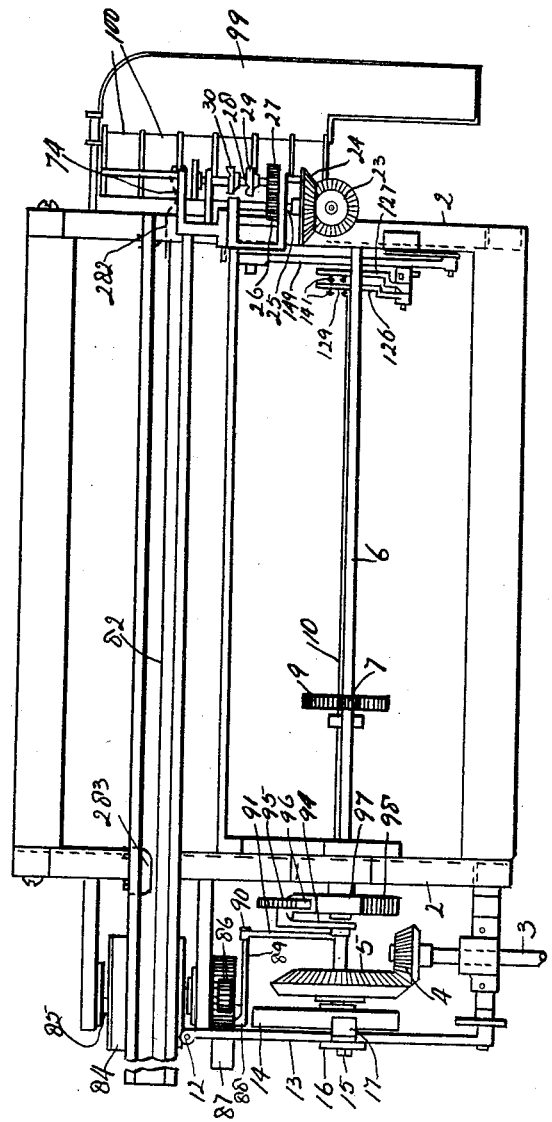

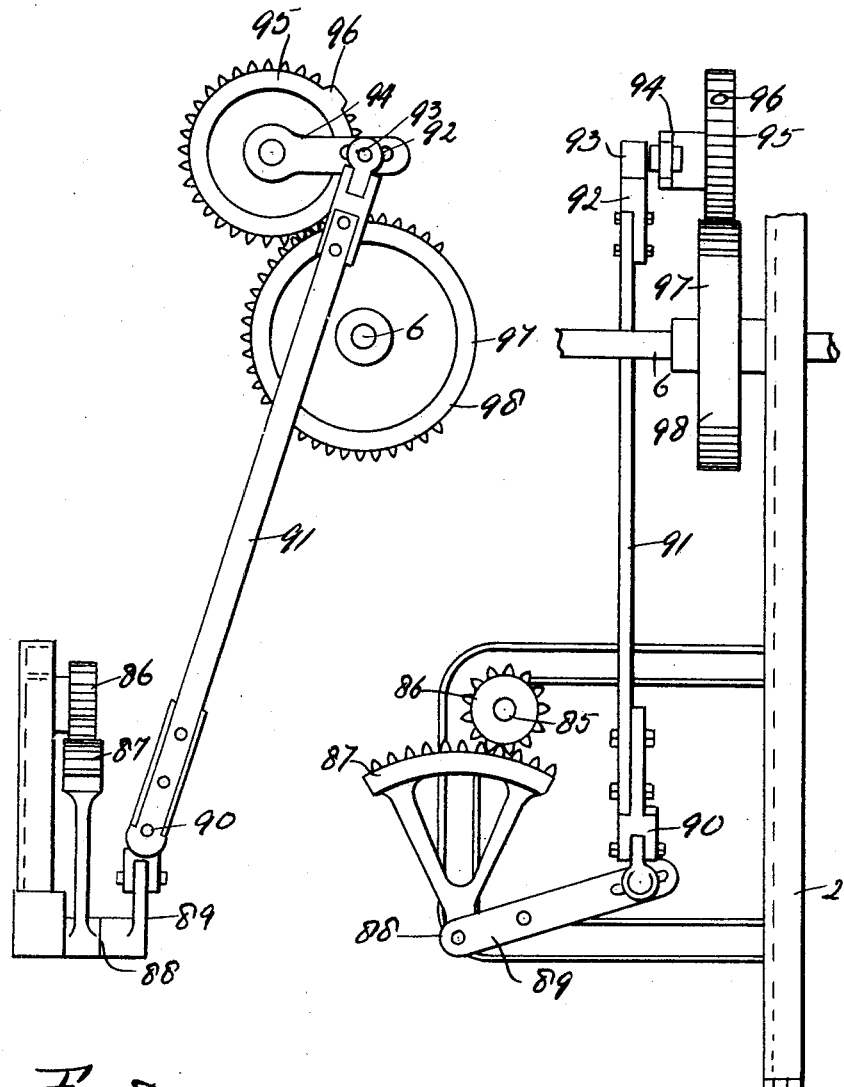

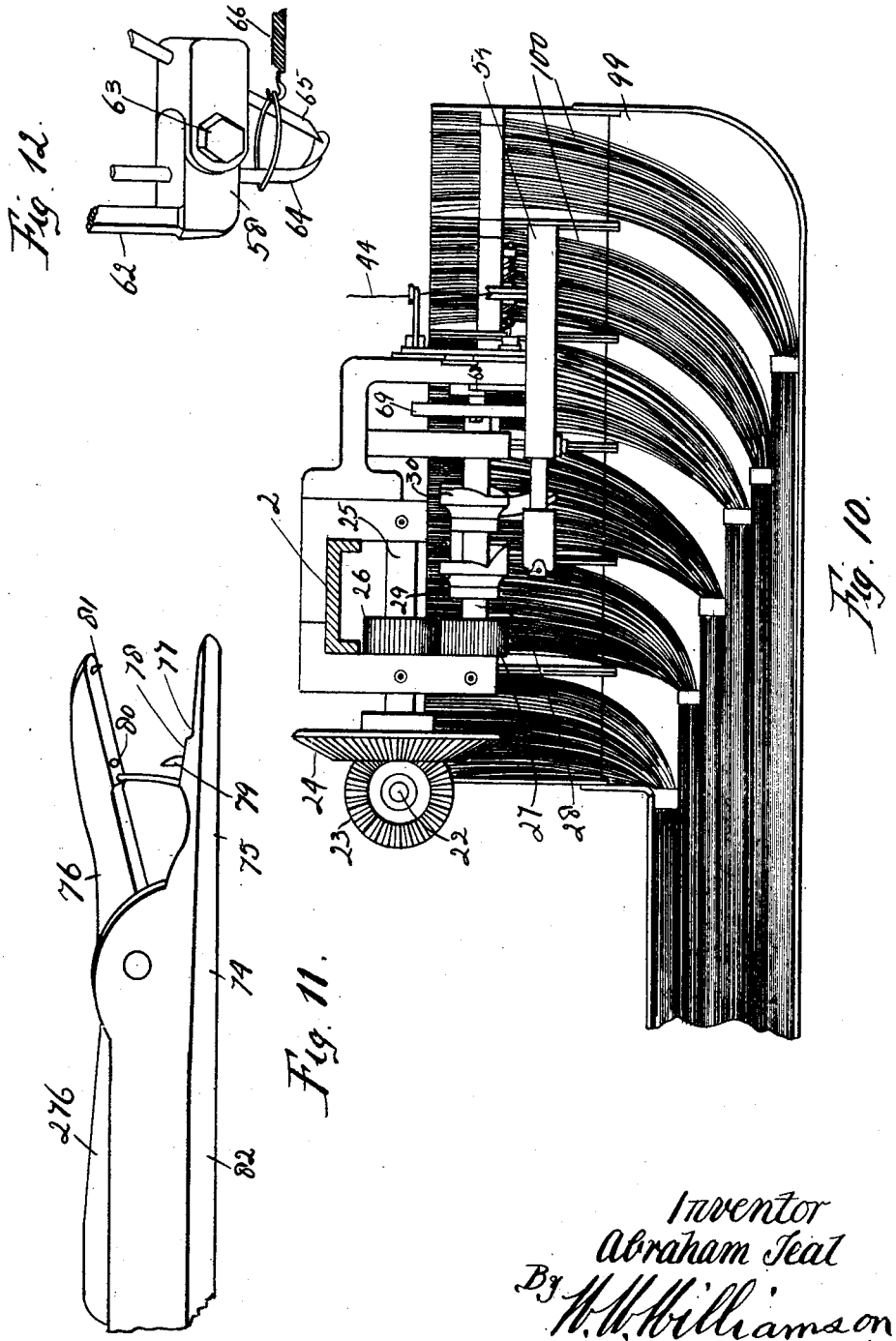

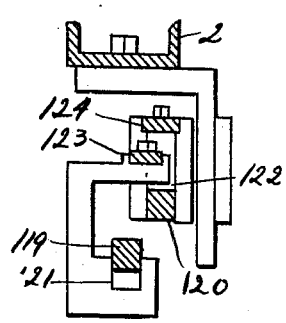
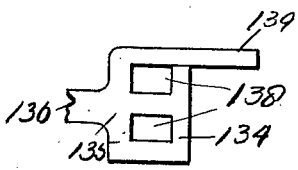
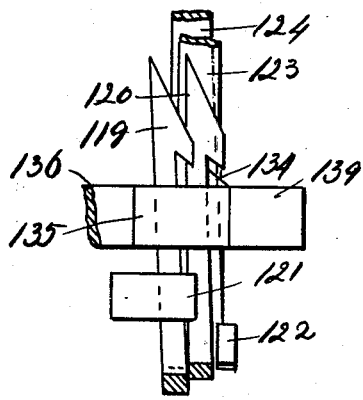
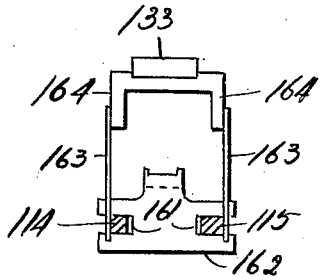

ABRAHAM TEAL, OF FRANKFORD, PENNSYLVANIA.

LOOM.

1,404,170.  Specification of Letters Patent.  Patented Jan. 17, 1922.

Application filed August 10, 1917. Serial No. 185,477.

*To all whom it may concern:*

Be it known that I, ABRAHAM TEAL, a subject of the King of Great Britain, residing at Frankford, in the county of Philadelphia and State of Pennsylvania, have invented new and useful Improvements in Looms, of which the following is a specification.

My invention relates to a new and useful improvement in looms, and more particularly to that class of looms which are used for weaving hair cloth, and has for its object to provide in combination with a Jacquard loom mechanism, a mechanism for weaving silk with the hairs whereby numerous designs of fabric may be produced both in color and configuration.

Another object of the invention is to provide a nipper of unique construction and means for operating the same in combination with the selector motion whereby hairs of certain color will be fed to the loom and whereby silk will also be fed to the loom at predetermined intervals.

A further object of the invention is to provide a hair box motion or operating mechanism whereby the different boxes or compartments may be moved about to bring a certain one in the proper position so that a hair of the desired color may be withdrawn.

A still further object of the invention is to provide a nipper motion whereby the nipper may be intermittently operated and locked at a certain point.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Fig. 1, is a front elevation of a loom illustrating the embodiment of my invention showing the elements in place on the ordinary Jacquard loom.

Fig. 2, is an end view, portions of which are broken away.

Fig. 3, is a similar view of the opposite end of the loom portions being eliminated and parts being broken away to illustrate certain constructions.

Fig. 4, is a fragmentary rear elevation of the loom on a smaller scale having portions broken away.

Fig. 5, is an opposite end view of the loom with the hair boxes and hair selector and silk feed mechanism removed.

Fig. 6, is a section on a reduced scale at the line 6—6 of Fig. 4.

Fig. 7, is a plan view of the lower portion of the loom the upper parts being broken away.

Fig. 8, is an end view of the mechanism for transmitting motion to the nipper stick.

Fig. 9, is a side elevation thereof.

Fig. 10, is a plan view of the hair boxes and tray illustrating the relation thereof to the mechanism for releasing the silk feed nipper.

Fig. 11, is a perspective view of the nipper.

Fig. 12, is a similar view of the hair selector.

Fig. 13, is a detail sectional view of the box catches and working levers therefor.

Fig. 14, is a fragmentary side elevation thereof.

Fig. 15, is a plan view of the socket end of the broken back or jointed lever.

Fig. 16, is a front elevation of the guides for the star wheel catches.

Fig. 17, is a plan view thereof.

In carrying out my invention as here embodied, 2 represents the frame of the loom in a suitable portion of which is journalled a power shaft 3 having a beveled pinion 4 mounted thereon arranged to mesh with a beveled gear 5 the latter being mounted upon the crank shaft 6 running longitudinally of the loom. On the crank shaft 6 intermediate its length is mounted a gear 7 meshing with an idler or intermediate gear 8 which in turn meshes with the gear 9 mounted upon the lower shaft 10.

The jacquard cylinder 211, Fig. 2, is operated by a rod 11 connected with the stud on the intermediate gear 8, Fig. 4, which takes the place of the ordinary sweep operating means while the jacquard machine 212 is operated through a rod 12 connected with the lever 13, Figs. 3 and 7, actuated by a cam 14 which is also mounted on the crank shaft 6. Said lever 13 is journalled at the end opposite the rod 12 to some suitable portion of the loom frame as at 19 and is provided with a stud 15 located adjacent the cam and on this stud is journalled the plate 16 the ends of which project above and below the lever and these projecting ends carry the short shafts for the friction rollers 17 and 18 the former forming the outer face of the cam flange and the latter the inner face thereof.

On one end of the aforementioned lower shaft 10 is mounted a beveled gear 20, Figs. 1, 3 and 5, meshing with the beveled pinion 21 mounted on the lower end of a vertical shaft 22, Fig. 5, the upper end of said shaft also carrying a beveled pinion 23 which meshes with the beveled gear 24 mounted upon a short power transmission shaft 25, Figs. 1, 3, 5 and 10. Forming a part of the silk feed and hair selector mechanism plainly shown in Fig. 3, said shaft carries a gear 26, Fig. 10, meshing with a similar gear 27 directly in front of it, Fig. 3, said gear 27 being mounted upon a cam shaft 28 running parallel with the shaft 25, Fig. 10. On the cam shaft 28 are mounted two cams 29 and 30. The cam 29, Figs. 3 and 10 actuates the silk release of which the lever 31 forms a part, and this lever is pivoted at 32 and has its upper end normally held in contact with the cam 29 by a spring 231, Fig. 3. When the cam 29 is in the proper position, as will be readily understood, the lower end of the lever 31 will engage the contact member 33 on the push rod 34 to vibrate or move said push rod outward against the action of the spring 35 which is coiled about a portion of the push rod, one end of said spring engaging a pin, or its equivalent, carried by the push rod as the movable member while the other end engages the guide 36 in which one part of the push rod is slidably mounted. From the guide 36 a part of the push rod 34 projects upwardly to form a contact portion or strand 37 and the upper end of this contact portion is bent over and runs through a guide 38 which with the guide 36 will hold the push rod in its proper line of travel during its vibrating motion. The contact portion 37 of this push rod when forced outward by the lever 31 engages the coacting or complementary member 39 mounted upon the silk release rod 41, Figs. 1 and 3 and the lower portion of this rod is bent inward at right angles as at 42 with its extreme inner end again bent at right angles to form the silk engaging finger 43 the latter engaging the silk thread 44 under certain conditions as will be further described for holding said thread down to present a straight strand in the proper position for being engaged by a nipper which will be hereinafter more fully described, said silk thread being guided throughout a portion of its travel by an eye 40 carried by the complementary member 39. The silk release rod 41 is slidably and rotatably mounted in suitable brackets 45 located at different points on the silk feed lever 46, said lever being pivoted at 47 and has its upper end projecting rearwardly and inwardly to which is secured one end of the spring 48 the opposite end of said spring being secured to some suitable stationary part such as the bracket 49. The lower end of the silk feed lever has an inwardly projecting portion 50 with a finger 41 at right angles thereto, said finger being provided with an eye 52 for the passage of the silk thread 44. The aforementioned release rod 41 is carried by said silk feed lever 46 and is provided at its upper end with a friction roller 53 adapted to be engaged by a push lever 54 for forcing the release rod 41 downward and said lever 54 is pivoted at 55 to a suitable bracket or lug, and has its opposite end connected to the jacquard machine 212 through the medium of the flexible connection or spring 56, Figs. 3 and 4 in the ordinary manner as will be obvious.

When because of the holes in the pattern card 213 the outer end of the push lever 54 is forced downwardly through the medium of the flexible connection 56 and the release rod 41 will be pushed downward against the action of the spring 241 coiled about said release rod and this will cause the finger 43 to bring the thread 44 to a vertical position between said finger and the eye 52 and holds said thread taut, said thread being slightly held back by the tension member 244 and when the release rod 41 has been pushed down to its limit then the further movement of the push lever 54 will cause the silk feed lever 46 to be oscillated so that its lower end in which is the eye 52 will be moved inward to a pont adjacent the hair selector 58 and also in the region of the nipper carried by the nipper stick both the hair selector and nipper stick to be presently described.

The other cam 30 actuates a lever 57 which controls the opening and closing of the hair selector 58, Fig. 3, and said lever is pivoted at 59 and normally held in contact with the cam 30 by the spring 60 and the lower end of said lever carries an adjustable stud 61 adapted to engage the selector arm 62 at predetermined intervals. This arm which is a part of the hair selector is pivoted at 63 and carries the selector hammer 64 adapted to coact with the selector needle 65, said selector hammer being normally forced toward said selector needle by means of a suitable spring 66 all of which is of ordinary construction.

Said hair selector 58 is carried by a slide 67 actuated by a link 68 connected to the crank disc 69 the same being mounted upon the shaft 28 so that as said shaft revolves motion will be transmitted to the slide 67 and cause the hair selector 58 to be projected into the bunch of hairs in a hair box from which one hair will be taken by the hair selector in the same manner as in operative position. As it is necessary that the hair selector be held open to prevent the same from feeding a hair at the same time silk is being fed I provide suitable means for actuating the selector arm 62 said means being operated from the silk feed lever. As shown this operating means comprises a link 70 one end of which is connected with the silk feed lever 46 the opposite end being connected with an operating lever 71 pivoted at 72 and provided with a stud 73 to engage the selector arm 62. When the silk feed lever 46 is oscillated to throw its lower end inward so that the silk thread may be drawn into the warp motion will be transmitted through the link 70 to the operating member 71 causing it to be rotated about its pivot point until the stud 73 engages the selector arm 62 which will move the hammer 64 away from the needle 65 and hold them apart to prevent a hair from being removed from the hair box while the silk feed lever remains in this position.

The nipper 74, Figs. 1, 7 and 11, takes either the hair or silk thread and feeds it through the warp and said nipper consists of a stationary jaw 75 and a movable pivoted jaw 76 provided with an operating arm 276. The meeting face of the stationary jaw 75 is cut away as at 77 at its outer end so that when the two jaws are closed a space is left sufficient to permit the free passage of the silk thread therethrough, and to the rear end of this cutaway portion is a projection 78 arranged to coact with the meeting face of the other jaw so as to firmly hold a hair when the jaws are closed.

A pin or tooth 79 extends from the projection 78 and is arranged to register with a hole 80 in the coacting jaw and this pin or tooth prevents the hair from passing too far into the nipper since said hair just before being gripped rests upon said pin and at the forward end of the other jaw is another pin or tooth 81 which coacts with the stationary jaw when the two jaws are closed and engages the silk thread to pull the same through the warp, said thread freely passing the sliding member and the cutaway portion 77.

The movable jaw of the nipper is operated or opened and closed in the ordinary manner at each end of the movement of the horizontal nipper stick 82 which carries said nipper 74, by the operating arm 276 of said nipper contacting with the blocks 282 and 283, Fig. 7. The nipper stick is oscillated longitudinally of the loom by means of a strap or belt 83 similar to this now in use which runs over a drum 84 the latter being mounted upon a shaft 85, Figs. 2, 4 and 7. This drum receives its motion through the pinion 86 mounted on the drum shaft 85 and which meshes with a quadrant 87 journalled at 85, Figs. 2, 8 and 9 and this quadrant is provided with a quadrant arm 88 which is connected at its outer end by means of a cross head 90 with a link 91 the upper end of said link being connected by a cross head 92 with the stud 93 of the crank or sweep 94, the latter being carried by the intermittent pinion 95 which is provided with a relatively wide intermittent or dwelling tooth 96, said tooth adapted to coact with the blank space 97 of the mutilated gear 98, said mutilated gear being mounted upon the crank shaft 6 from which it receives its motion.

During the time the intermittent tooth 96 is in engagement with the blank space the intermittent gear and the parts receiving motion therefrom stop so that the nipper stick remains in a stationary position while the comb is tightening upon the weft in the warp and the time elapsing during the dwelling of the nipper stick is equal to that usually employed by the nipper stick running the entire length of the lay, and as hair cloth is woven relatively narrow the dwelling of the nipper stick prevents any unnecessary silk being drawn from its bobbin so that waste is prevented and the possibility of any additional length of silk becoming entangled in the warp threads.

The hair tray 99, Figs. 1, 3, 7 and 10, is connected to and communicates with a plurality of hair boxes 100, each of which, in itself, is of the ordinary construction. The boxes and trays are connected to each other, so as to move in unison, and said boxes are provided with depending guides 101, Figs. 1 and 3, arranged to slide upon the track bars 102 running parallel to each other, and mounted in suitable brackets 103, while the tray rests upon suitable friction or rest rollers 104 journalled in a suitable bifurcated bracket 105, carried by a suitable part of the loom frame.

The boxes carry a rack 106 which is operated by a rack gear 107 mounted on a shaft 108 journalled in the slide bars 131 slidably mounted in the sockets 132 secured to the loom frame. The shaft 108 carries a star wheel 109, at one end, with which coacts a lock 110 normally forced into contact and held in engagement with the star wheel by means of a spring 111, and the head of said lock, when the boxes are to be held in a stationary position, engages two adjacent points of the star wheel and prevents any movement of the boxes. The star wheel and its spring is suitably supported by a depending bracket 133 carried by one of the slide bars 131.

The hair boxes are also intermittently moved backward and forward within the limits of a single box to prevent the selector picking hairs from the same locality each time, or to prevent the selector being continuously projected into that part of a box where there is no hair and the mechanism for operating the boxes in this way comprises a link 170, one end of which is attached to the shaft 108, the other end being attached eccentrically to the crank disc 171 mounted on one end of a shaft 172 journalled in the loom frame and carrying on its other end a gear 173 with which meshes a pinion 174. This pinion is journalled on a short shaft 175, and also acts as a ratchet wheel with which coacts a pawl or dog 176 carried by the ratchet arm 177 journalled on the short shaft 175 and to this arm is connected one end of the link 178 the other end being attached to the lay. With each movement of the lay, motion is transmitted to the link 170 which moves the shaft 108 backward or forward and as said shaft is journalled in the slide bars 131 said bars will be moved through their brackets 132, said slide bars carrying the depending bracket 133 and the lock 110 with them and because of the strength of the spring 111 the rack gear 107 is prevented from revolving and therefore the boxes are moved either backward or forward along the track bars 102 through the medium of the rack bar 106 which is in mesh with the rack gear 107, thus changing the position of the hair box which is directly beneath the selector, relative to said selector. On the opposite end of the shaft 108 is arranged a pin wheel 112 having a plurality of spaced pins 113 which project from one face of the pin wheel, and are adapted to be engaged by the hooks 114 and 115 for rotating the shaft 108 in the desired direction to change the relative positions of the hair boxes. Each of the hooks 114 and 115 is provided on its inner edge with an arcuate projection 167, so that when one of the hooks, for instance, the hook 115 is drawing down on a pin to turn the pin wheel 112 the pin adjacent the arcuate projection on the other hook 114 will engage said arcuate projection during the upward movement of said pin, and move the hook 114 outward against the action of its spring 163, Figs. 6 and 17 a sufficient distance to move the nose of said hook 114 out of the path of travel of the preceding pin, so that the movement of the pin wheel will not be interfered with by the hook 114, which is doing no work. The hooks 114 and 115 are connected respectively to the levers 116 and 117, Fig. 6 both of which are pivoted to a single stud 118, and these levers 116 and 117 have the springs 165 and 166 respectively connected thereto for normally forcing said levers in that direction will normally raise the hooks 114 and 115. To the opposite ends of these levers 116 and 117 are pivoted to the lower ends of the catches 119 and 120, Figs. 6, 13 and 14, and these catches run through sockets 121 and 122 Fig. 15, of the levers 123 and 124, Figs. 6 and 13 secured to the arms 126 and 127 respectively, Fig. 9, each of said arms being pivoted to a bracket 124 secured to the loom frame and each provided with a pair of pins 128. The levers 123 and 124 are acted upon by springs 137, Fig. 6, connected therewith to normally force them in that direction which will move the free ends of the arms 126 and 127 downward.

To one of the pins 128 of each arm 126 and 127, Fig. 7, is loosely connected a rod 129, each rod being connected to a separate lever 130, identical in construction and operation, both of which are connected to the jacquard machine 212 by rods 230 and which are operated at predetermined intervals by said jacquard machine, according to the holes in the pattern cards 213.

When, because of the holes in the pattern cards 213 one of the levers 130, Fig. 4, as for instance the inner one, is operated so that the end connected with the jacquard machine 212 is drawn upward, the rod 129 connected to the arm 126 will be released to permit said arm 126 and its connected lever 123 to be acted upon by its respective spring 137 and this will cause the nose of the catch 119 to engage the forward edge 134 of the socket end 135 of the broken back or jointed lever 136, Fig. 6. The socket end of the broken back or jointed lever 136 is provided with two sockets 138, Figs. 14 and 15 through which pass the catches 119 and 120, the latter being entirely surrounded and guided by the socket end of the jointed lever 136.

The jointed or broken back lever 136 is also provided with a projecting finger 139 which passes through and is guided by a suitable guide 140 attached to the loom frame in any suitable and well known manner so as to limit the movements of said jointed lever 136.

Two other rods 141 are connected with the other pins 128 of each of the levers 126 and 127 and also with a lever 142, the latter being connected by some suitable flexible means such as a cable with the jacquard cylinder actuating catch, and when the lever 142 is raised, the cylinder actuating catch is drawn out of the path or travel of the jacquard cylinder, so that said cylinder will not be turned and the the pattern card will not be advanced, and this happens only when the silk or hairs are missed, and not drawn into the warp. Because of the relatively great movement necessary for the lever 142 to actuate the cylinder catch, I have found it advisable and advantageous to form said lever 142 as a compound lever, said lever 142 forming one of the sections or elements, and the complementary or cooperating lever 143 forming the other element, said lever 143 being pivoted at 144 and provided at its free end with a stud 145 for engaging the lower edge of the lever 142, and said lever 143 is limited in its downward movement by a suitable stop 146. The lever 143 has adjustably connected thereto a link or rod 147 to the lower end of which is pivoted a catch 148 passing through and guided by a lever 149 pivoted at 150, Fig. 6. Should the nipper fail to take hold of a hair or thread the thread back mechanism (not shown) because it is old and forms no part of my invention, will actuate the catch 148 and cause it to be engaged by the lever 149 in its upward motion thereby raising the levers 143 and 142 by means of the rod 147, which as before stated, will draw the cylinder actuating catch out of the path of travel of the jacquard pattern cylinder. The lever 149 is provided with a depending arm 151, Figs. 5 and 6, the free end of which engages the cam 152 mounted upon the shaft 10. During each revolution of the shaft 10, the arm 152 will cause the lever 149 to be raised, but no further action takes place unless the hair thread is missed in which case the catch 148 will be actuated to keep the jacquard pattern cylinder in the same position.

The broken back lever 136 consists of two members 153 and 154 pivoted together at 155 and normally held in longitudinal alignment by a spring 156, the ends of which are connected to lugs 157 formed integral with the members of the lever. The said broken back lever is pivoted at 158 to some suitable portion of the loom and said lever carries a friction roller 159 which is engaged by a cam 160 mounted upon the shaft 10 for raising the broken back lever to actuate the catches 119 and 120 when either is brought into engagement with the edge 134 of the socket end of the said broken back lever. If for any reason, both of the catches 119 and 120 should be caused to engage the edge 134 of the socket end of the broken back lever, so that both hook 114 and 115 are in engagement with the pins of the pin wheel 112, then the cam 160 as it brings pressure to bear upon the broken back lever will cause, said lever to buckle or bend at its joint 155 against the action of the spring 156, and no movement of the catches 119 and 120 takes place.

The hooks 114 and 115 pass through slots 161 in the guide bracket 162 secured to a suitable part of a loom, and said hooks are normally forced inward toward each other or into operative relation with the pin wheel by means of flat springs 163 engaging the outer edges of the hooks and extending across the guide bracket, said springs being fastened to some suitable support 164 carried by the depending bracket 133. When the broken back lever is raised to actuate the catch 119 (or 120) for operating the pin wheel through the hook 114 (or 115) the spring 165 (or 166) connected to the lever 116 (or 117) of the catch 119 (or 120) is expanded beyond its normal condition so that when the broken back lever is returned to its normal position, the spring 165 (or 166) will return its respective lever to its normal position.

The operation of my loom is as follows:—

Power is transmitted in any suitable manner to the power shaft 3, from which power and motion are transmitted to the crank shaft 6 through the pinion and gear 4 and 5 respectively, and from this crank shaft, power and motion are transmitted to the lower shaft 10 through the gears 7, 8 and 9.

The silk feed and hair selector mechanism recives its motion from the shaft 10 through the parts 20, 21, 22, 23, 24, 25, 26, 27 and 28.

When because of the holes in the pattern card, the outer end of the push lever 54 is forced downwardly through the medium of the flexible connection 56, when actuated by the jacquard machine the silk feed lever 46 will be oscillated so that its lower end will move into a point adjacent the hair selector 58, or in the region of the path of travel of the nipper 74. This action will also have caused the release rod 41 to be pushed downward against the action of the spring 241, and this will cause the finger 43 to bring the thread 34 to a vertical position between said finger and the eye 52, and hold said thread taut until the nipper moves outward and grips said thread after which the thread is drawn into the warp as will be obvious.

As the lower end of the silk feed lever 46 is thrown inward to bring the thread 44 into the proper position for the nipper to take hold of the same, the link 70 will be moved in the proper direction to bring the stud 73 of the operating member 71 into engagement with the selector arm 62, so as to hold the hair selector open and prevent the same from grasping a hair while the thread is being fed to the loom. After the thread has been gripped by the nipper, the cam 29 advances to the proper position to permit the operation of the lever 31 through the action of the spring 131, causing the lower end of said lever to make contact with the contact member 33 on the push rod 34, forcing said push rod outward against the spring 35 which will bring the contact portion or strand 37 of said push rod into engagement with the complementary member 39 on the silk release rod 41 which will rotate said release rod so that the finger 43 thereof will be disengaged from the thread and permit that portion of the thread which passes under the finger 43 to be drawn into the warp.

When the finger 43 is returned to the position shown in Figure 12, the thread may be on the wrong side of said finger, so that the latter could not act upon the thread, but the next movement of the push rod 34 will again rotate the release rod 41 so that when the finger is returned to the position shown in Figure 12 the next time and the thread 44 is slack, said finger 43 will pass over the thread.

Upon each revolution of the shaft 28 the cam 30 will be advanced to the proper position to permit the spring 60 to actuate the lever 57 and bring the stud 61 into engagement with the arm 62 for opening the hair selector, providing the thread is not being fed to the warp, and at the same time the slide 67 carrying the hair selector is moved downward through the medium of the crank disc 69 and link 68, to project the hair selector into the bunch of hairs in the hair box beneath the hair selector, and when in this position the cam 30 will advance to a position to move the stud 61 out of engagement with the arm 62, at which time the hair selector will be closed by the spring 66 and when raised by the crank disc 69 and link 68 to pull but a single hair from the hair box and hold it in the proper position to be grasped by the nipper and fed to the warp.

The nipper which feeds to weft threads and hairs is carried by a nipper stick 82 oscillated by a belt 83 looped about a drum 84 which is mounted on the shaft 85 rotated through the medium of the pinion 86 actuated by the quadrant 87, connected by suitable means with the sweep 94, the latter receiving its motion through an intermittent pinion 95 and intermittent gear 98 from the crank shaft 6.

When the color of the hairs which are being used as the weft of the hair cloth is to be changed from one to another, the boxes 100 with their tray 99 are moved from one side to the other, which movement is controlled by the pattern card, and this change of position in the boxes is caused by the jacquard machine. One of the rods 129 will be released from the pins 128 to which it is connected, thus freeing one of the levers 126 or 127 and permitting it to be drawn downward by its respective spring 137, thereby swinging the lever 123 or 124 so as to cause either of the catches 119 or 120 to engage the edge of the socket of the broken back or jointed lever, so that one of said catches will be actuated when such broken back lever is raised by the cam 160. As the cam 160 advances and raises the broken back lever 136, the hook connected therewith will be actuated and move its respective lever 116 or 117 to draw down one of the hooks 114 or 115, thereby actuating the pin wheel 112 to revolve the shaft 108 which will cause the hair box to be moved in the proper direction to bring a different hair compartment beneath the hair selector.

If for any reason the thread or hair to be fed into the warp is missed by the nipper, the thread back mechanism, as at present used upon the looms of this character and which forms no part of my invention will actuate the catch 148, so that the nose thereof will be in the path of upward travel of the lever 149, so that when said lever 149 is raised by the cam 152 through the medium of the depending arm 151, the compound lever comprising the lever elements 142 and 143 will be actuated to draw the cylinder actuating catch out of the path of travel of the jacquard pattern cylinder 211, thus preventing the advance of the pattern card 213, so that the parts of the loom will repeat the previous movements until the proper hair or thread is drawn into the warp.

Of course I do not wish to be limited to the exact details of construction as herein shown, as these may be varied within the limits of the appended claims without departing from the spirit of my invention.

Having thus fully described my invention, what I claim as new and patentable, is—

1. In a loom, an oscillating silk feed lever, means for oscillating said lever, and a silk release rod slidably mounted with relation to the silk feed lever adapted to assist in holding the silk taut and releasing the same.

2. In combination with a Jacquard loom, an oscillating feed lever, a release rod slidably mounted upon the feed lever and means controlled by the jacquard machine for forcing the release rod in one direction and oscillating the feed lever through said rod.

3. In combination with the loom, an oscillating feed lever, means for normally holding said lever in one position and release rod slidably mounted upon the feed lever, means for normally forcing said rod upward and means coacting with said rod for normally forcing it downward when actuated by the loom machine, said downward action terminating at a predetermined point, and then causing the feed lever to be moved in one direction.

4. In combination with the loom, an oscillating feed lever means for normally holding said lever in one position and release rod slidably mounted upon the feed lever, means for normally forcing said rod upward and means for rotating the release rod.

5. In combination with the loom, an oscillating feed lever means for normally holding said lever in one position and release rod slidably mounted upon the feed lever, means for normally forcing said rod upward, a member carried by the release rod, means coacting with said member for rotating said rod, a spring actuated lever adapted to operate said last named means for causing the same to engage the member and thereby rotate the release rod and a cam for controlling the movements of said spring actuated lever.

6. In a loom, the combination with the thread feed mechanism and a hair selector of a plurality of boxes arranged side by side beneath the hair selector, a hair tray carried by said boxes and in communication therewith, a mechanism controlled by the loom, a rack carried by the boxes, a rack gear meshing with the rack for transmitting motion thereto and thereby moving the boxes to bring a different box beneath the hair selector, locking means to prevent the accidental rotation of the rack gear, and a mechanism including a ratchet actuated by the loom mechanism for shifting the position of the rack gear and with it the rack, hair boxes and tray to change the position of the box beneath the hair selector with relation to said hair selector.

7. In a loom, the combination with the thread feed mechanism and a hair selector of sockets, carried by the loom frame, slide bars, slidably mounted in said sockets, a shaft journaled in said slide bar, a rack gear on said shaft, track bars, a plurality of hair boxes having depending guides slidably mounted on said track bars, a hair tray connected with said boxes, means for supporting said tray, a rack carried by the box and meshing with the rack gear whereby the revolving of the shaft will move the hair boxes to change their relative positions with relation to the hair selector.

8. In a loom, the combination with the thread feed mechanism and a hair selector of sockets, carried by the loom frame, slide bars, slidably mounted in said sockets, a shaft journaled in said slide bars, a rack gear on said shaft, track bars, a plurality of hair boxes having depending guides slidably mounted on said track bars, a hair tray connected with said boxes, means for supporting said tray, a star wheel mounted on said shaft and a depending bracket carried by one of the slide bars, a lock slidably mounted in the bracket and adapted to coact with two adjacent points of the star wheel to prevent accidental rotation of the shaft, a spring for holding said lock in engagement with the star wheel, and means for intermittently moving the hair boxes backward and forward within the limits of a single box.

9. In a loom, the combination with the thread feed mechanism and a hair selector of sockets, carried by the loom frame, slide bars, slidably mounted in said sockets, a shaft journaled in said slide bars, a rack gear on said shaft, track bars, a plurality of hair boxes having depending guides slidably mounted on said track bars, a hair tray connected with said boxes, means for supporting said tray, a star wheel mounted on said shaft and a depending bracket carried by one of the slide bars, a lock slidably mounted in the bracket and adapted to coact with two adjacent points of the star wheel to prevent accidental rotation of the shaft, a spring for holding said lock in engagement with the star wheel, a crank disc, a link eccentrically connected to the crank disc and to the shaft, whereby the slide bars with their component parts will be moved longitudinally to change the position of the hair boxes, a gear connected with the crank disc, a pinion meshing with said gear, and a ratchet arm carrying a dog coacting with the pinion, said ratchet arm receiving motion from a suitable portion of the loom, whereby the hair boxes will be intermittently moved backward and forward within the limits of a single box.

10. In a loom, the combination with the thread feed mechanism and a hair selector of sockets, carried by the loom frame, slide bars, slidably mounted in said sockets, a shaft journaled in said slide bars, a rack gear on said shaft, track bars, a plurality of hair boxes having depending guides slidably mounted on said track bars, a hair tray connected with said boxes, means for supporting said tray, a star wheel mounted on said shaft and a depending bracket carried by one of the slide bars, a lock slidably mounted in the bracket and adapted to coact with two adjacent points of the star wheel to prevent accidental rotation of the shaft, a spring for holding said lock in engagement with the star wheel, a crank disc, a link eccentrically connected to the crank disc and to the shaft, whereby the slide bars with their component parts will be moved longitudinally to change the position of the hair boxes, a gear connected with the crank disc, a pinion meshing with said gear, a pin wheel attached to the opposite end of the shaft, a plurality of pins projecting from one face thereof, hooks coacting with said pins for rotating the pin wheel and thereby changing the relative positions of the hair boxes and means controlled by the loom machine for actuating said hooks.

11. In a loom, the combination with the thread feed mechanism and a hair selector of sockets, carried by the loom frame, slide bars, slidably mounted in said sockets, a shaft journaled in said slide bars, a rack gear on said shaft, track bars, a plurality of hair boxes having depending guides slidably mounted on said track bars, a hair tray connected with said boxes, means for supporting said tray, a star wheel mounted on said shaft and a depending bracket carried by one of the slide bars, a lock slidably mounted in the bracket and adapted to coact with two adjacent points of the star wheel to prevent accidental rotation of the shaft, a spring for holding said lock in engagement with the star wheel, a crank disc, a link eccentrically connected to the crank disc and to the shaft, whereby the slide bars with their component parts will be moved longitudinally to change the position of the hair boxes, a gear connected with the crank disc, a pinion meshing with said gear, a pin wheel attached to the opposite end of the shaft, a plurality of pins projecting from one face thereof, hooks coacting with said pins for rotating the pin wheel and thereby changing the relative positions of the hair boxes and each of said hooks having an arcuate projection on its inner edge to automatically disengage the noses of said hooks from the pins when said hooks are doing no work, levers pivoted to the loom frame and to said hooks springs for normally forcing said levers in that direction which will raise the hooks, catches pivoted to the opposite ends of the levers, a jointed lever, means for raising said jointed lever, and means for causing either of the catches to engage the jointed lever whereby one of the hooks will be actuated to rotate the pin wheel and thus move the hair boxes to shift their relative positions.

12. In a loom, the combination with the thread feed mechanism and a hair selector of sockets, carried by the loom frame, slide bars, slidably mounted in said sockets, a shaft journaled in said slide bars, a rack gear on said shaft, track bars, a plurality of hair boxes having depending guides slidably mounted on said track bars, a hair tray connected with said boxes, means for supporting said tray, a star wheel mounted on said shaft and a depending bracket carried by one of the slide bars, a lock slidably mounted in the bracket and adapted to coact with two adjacent points acting with said pins for rotating the pin wheel and thereby changing the relative positions of the hair boxes and each of said hooks having an arcuate projection on its inner edge to automatically disengage the noses of said hooks from the pins when said hooks are doing no work, levers pivoted to the loom frame and to said hooks springs for normally forcing said levers in that direction which will raise the hooks, catches pivoted to the opposite ends of the levers, a jointed or broken back lever consisting of two members pivoted together and normally held in alignment by a suitable spring, said jointed lever being pivoted at one end and provided at its opposite end with sockets for registration with the catches, a lower shaft, a cam on said shaft arranged to coact with the jointed or broken back lever for raising the latter, arms pivoted to the loom frame, depending spring, actuated levers projecting from said arms, and coacting with the catches, whereby either of said catches may be moved into engagement with one of the walls of the socket of the jointed lever, whereby such catch may be raised for transmitting motion through the coacting elements to the hair boxes for shifting said boxes to change their relative positions and means controlled by the loom machine and loosely connected with the arms whereby said arms may be held in certain positions as specified.

13. In a loom, the combination of a shaft, a cam thereon, a lever pivoted to the loom frame and provided with a depending arm coacting with said cam, a catch adapted to be moved into the path of upward travel of the lever when a thread or hair is missed, a compound lever having connection with the cylinder actuating catch of the loom and a rod connecting the compound lever with the first named catch.

14. In a loom, a nipper stick, a rotatable drum, a belt passing around said drum and connected with the nipper stick, a crank shaft, an intermittent gear mounted on a crank shaft, an intermittent pinion meshing with said gear, a sweep connected to the pinion, a stud carried by said sweep, a cross head journaled on said stud, a quadrant pinion connected with the drum, a quadrant meshing with said pinion, a quadrant arm, connected with the quadrant, a cross head journaled to the outer end of said arm and a link connecting the two cross heads.

15. In a loom embodying the jacquard principle, the combination with a jacquard machine of a lever pivoted to some suitable portion of the loom frame, a rod connected with the free end of the lever, and the jacquard machine and stud intermediate the ends of said lever and plate journaled on said stud, the ends of said plate projecting above and below the lever, short shafts carried by the projecting ends of said plate, friction rollers mounted on said shafts, and a cam mounted on the crank shaft of the loom, and running between said friction rollers, so that one of said rollers engages the outer face and the other the inner face of the cam.

16. In a loom, the combination of a lower shaft, means for transmitting power and motion to said shaft, a beveled gear adjacent one end of said shaft, a vertical shaft, a pinion on the lower end of said vertical shaft meshing with the beveled gear, a beveled gear on the opposite end of said vertical shaft, a short power transmitting shaft forming a part of a silk feed, a hair selector mechanism, a gear on said short shaft, a cam shaft journaled adjacent the first named shaft and running parallel therewith, and a gear mounted on said cam shaft and meshing with the gear on the first named shaft.

In testimony whereof, I have hereunto affixed my signature.

ABRAHAM TEAL.